UNITED STATES PATENT OFFICE.

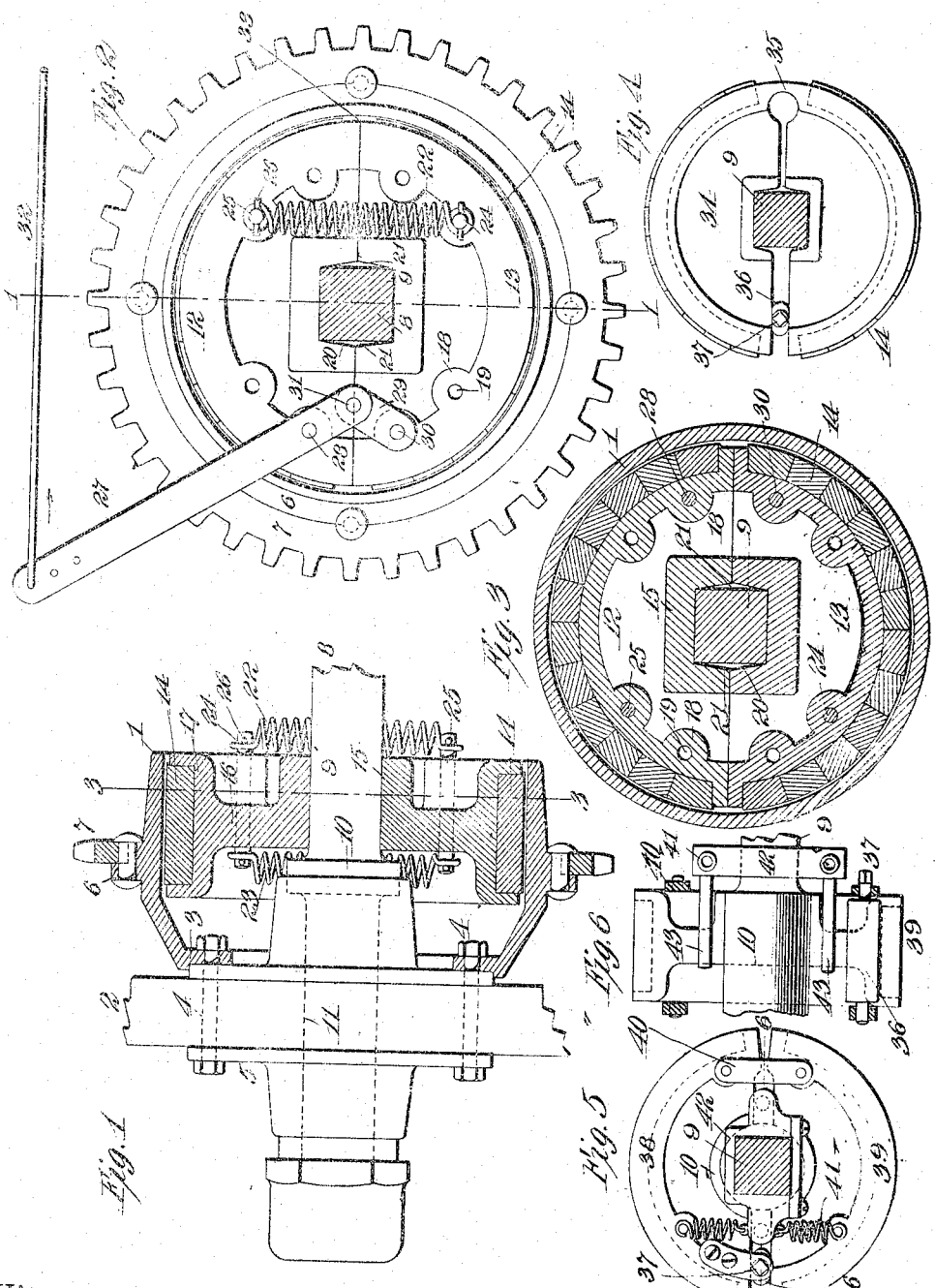

JOHN M. LANSDEN, JR., OF ORANGE, NEW JERSEY.

VEHICLE-BRAKE.

No. 867,057.　　　　　Specification of Letters Patent.　　　　Patented Sept. 24, 1907.

Application filed October 14, 1904. Serial No. 228,418.

*To all whom it may concern:*

Be it known that I, JOHN M. LANSDEN, Jr., a citizen of the United States, residing in Orange, county of Essex, State of New Jersey, have invented certain new and useful Improvements in Vehicle-Brakes, of which the following is a specification.

The object I have in view is to produce a brake for vehicles which will be adapted for use with automobiles of large size, will be possessed of few parts, will be self centering, will wear evenly and uniformly on the rubbing surfaces, may be arranged to have power applied in either direction horizontally or vertically, and which may be readily assembled or removed from the vehicle.

I attain these objects by the mechanism illustrated in the accompanying drawings, in which, Figure 1 is a transverse section taken through the lines 1—1 of Fig. 2, with a portion of the axle, hub and brake in position. Fig. 2 is an end elevation of the mechanism illustrated in Fig. 1. Fig. 3 is a transverse section taken on the lines 3—3 of Fig. 1. Fig. 4 is a view similar to Fig. 2 on a reduced scale of a modification; and Fig. 5 is a similar view of another modification. Fig. 6 is a section on the line 6—6 of Fig. 5.

In all of the views like parts are designated by the same reference numerals.

In carrying out my invention, I attach a drum 1 having a cylindrical internal face, to the wheel 2. As shown in the drawings, the drum 1 is provided with a flange 3 having bolt holes through which pass the bolts 4, which bolts also serve to secure the spokes within the hub 5. As shown in the drawing, the drum 1 is provided with a second flange 6 to which is riveted the sprocket 7 by means of which the wheel is rotated, but this construction is simply for the purpose of illustration as it is obvious that the wheel may be rotated in any manner without affecting the operation of the brake. The axle 8 has a rectangular portion 9, a collar 10 of cylindrical shape and a bearing portion 11 with which the hub engages. Two shoes 12 and 13 are provided. These are made preferably of cast metal, each semi-circular in shape and each preferably of identical configuration. The curved peripheries of each shoe is provided with a channel within which bearing blocks 14 are inserted. These blocks are preferably of wood, but any other suitable material may be employed. As shown in Fig. 1, each brake block is provided with a hub portion 15, a narrower web 16 and an enlarged flange 17. As shown in Fig. 3, the blocks are provided with bosses 18, each having a circular hole 19 all of these holes being preferably the same size.

The hubs of the two brake blocks when in position upon the axle disclose an opening 20 having a straight parallel top and bottom closely engaging with the top and bottom of the axle and sides inclining at an angle from the edges of the axle to the center of the side thereof, forming a hexagonal opening, so that two triangular shaped spaces 21, 21, are formed between the sides of the axle and the inner bore of the hub. This shape of opening permits the bearing blocks to be separated at one edge a greater distance than at the other, without binding upon the axle.

The two brake blocks 12 and 13 are secured together and upon the axle 8 within the drum 1, by means of two springs 22, 23, one arranged on each side of the web 16, and having their extremities secured to bolts 24, 25. These bolts are provided with cotters 26 to hold the springs in position. The springs are under sufficient tension to clamp the two brake blocks upon the square portion 9 of the axle until separated by the brake applying mechanism.

The brake applying mechanism comprises a lever 27 secured to a pivot 28 which passes through one of the openings 19 in the block 12. To the end of the lever is secured a link 29 which is secured to a pivot 30 passing through an opening 19 in the block 13, immediately below the pin 28. The lever is secured to the link by a bolt 31. To the lever 27 is secured a rod, rope or chain 32 which leads to suitable actuating mechanism.

In assembling the brake the parts 12 and 13 are placed upon the square portion of the axle, and are connected together by the springs 22, 23. The lever 27 and link 29 are then attached in position, and the rod 32 secured to the lever 27 and the brake will be ready for action. It is to be noticed that the bosses 18 and holes 19 are symmetrically arranged. This is to permit the springs and levers and link to be reversed in position, that is to say, the springs may be placed upon the left side of the Fig. 2 and the lever and link upon the right side. This will permit the brake to be used without actuating mechanism leading in the opposing direction, also it will allow one form of brake shoe to be used indifferently upon the right and left side of the vehicle. The axle 8 being square, the brake shoes may be adjusted so that the rod 32 will pull in a vertical direction whenever such will be necessary.

In operation, the lever 27 being moved in the direction of the arrow (Fig. 2), the engagement of its bearing and the bearing of the link 29 will form a toggle joint and separate the two sections 12 and 13. These sections will be separated against the tension of the springs, and will pivot at the point 33, the triangular shape of the openings 21 permitting the two sections to separate without binding upon the axle. The movement of the lever 27 will be continued sufficiently to bring the blocks 14 into engagement with the interior of the drum 1 and stop rotation of the wheel to the desired extent.

Upon pressure being relieved from the lever 27 the springs will bring the blocks together and will relieve the engagement of the blocks with the interior of the drum. The manner of loosely mounting the brake blocks upon the axle will make the brake self centering, and the wear upon the periphery of the block will be uniform.

In the modification shown in Fig. 4 in lieu of the springs 22, 23, and instead of the form of brake blocks shown, a single block 34 may be employed. This block consists of two halves connected together by an elastic portion 35 forming a spring. In lieu of the toggle joint formed of the lever 27 and link 29, a cam 36, between the two halves of the block 34 may be used, this cam being rotated by a shaft 37 carrying a lever and mechanism similar to that illustrated in connection with Fig. 2.

In the modification shown in Figs. 5 and 6, the two blocks 38, 39 are secured together by a hinge 40, and are disengaged from the drum 1 by means of the spring 41. The two blocks are separated and brought into contact with the drum by means of the cam 36, as described in connection with Fig. 4. The collar 10 is extended as shown in Fig. 6, to serve as a bearing for the block, such collar being cylindrical as shown. To prevent rotation of the blocks upon this flange, a clamp 42 is secured upon the square portion of the axle, and is provided with stop pins or lugs 43, which enter the separating space between the blocks and prevent their rotation. This modification permits the making of the brake with true centers, there being then no need of adjustment to keep the jaws concentric with the axle and rotating brake drum.

Having now described my invention, what I claim and desire to secure by Letters Patent, is:—

1. The combination with an axle, having a squared portion, brake blocks engaging therewith, means for elastically engaging and for separating the brake blocks, the said brake blocks having an opening of hexagonal shape through which the axle passes, whereby the brake will be self-centering.

2. The combination with an axle, of two brake blocks thereon, means on the axle for preventing rotation of the blocks, springs for engaging the blocks together, an operating lever and link for separating the blocks, and bolt holes through the blocks, the holes being symmetrically arranged so that the brake blocks may be reversed.

3. In a vehicle brake, the combination with the axle and a wheel journaled thereon, and carrying a drum, of a brake block formed in two sections, surrounding the axle and adapted to engage with the drum, the said block being supported on the axle and removably connected therewith, means connected to the axle to prevent turning of the block, and means for expanding the sections and engaging the block with the drum, the said means being supported by the block.

4. In a vehicle brake, the combination with the axle and a wheel journaled thereon, and carrying a drum, of a brake block formed in two sections surrounding the axle and adapted to engage with the drum, the said block being supported on the axle and removably connected therewith, means connected to the axle to prevent turning of the block, and means for expanding the sections and engaging the block with the drum, the said means being removably connected to the axle.

This specification signed and witnessed this 29th day of September, 1904.

JOHN M. LANSDEN, Jr.

Witnesses:
DAVID S. LANSDEN,
JAS. F. COLEMAN.